United States Patent
Kandasamy (10) Patent No.: US 10,225,278 B1
(45) Date of Patent: Mar. 5, 2019

(54) METHOD OF ASSESSING REAL-TIME SECURITY OF SEQUENCED PACKET EXCHANGE (SPX) NETWORK CONNECTION

(71) Applicant: Syniverse Technologies, LLC, Tampa, FL (US)

(72) Inventor: Kathiravan Kandasamy, Frisco, TX (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/134,045

(22) Filed: Sep. 18, 2018

Related U.S. Application Data (60) Provisional application No. 62/560,154, filed on Sep. 18, 2017.

(51) Int. Cl.
*H04L 29/06* (2006.01)

(52) U.S. Cl.
CPC ......... *H04L 63/1433* (2013.01); *H04L 63/10* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 10,009,366 B2* | 6/2018 | Lefebvre | H04L 63/1425 |
| 2014/0172706 A1* | 6/2014 | Condry | G06Q 30/00 705/44 |
| 2017/0201545 A1* | 7/2017 | Nicodemus | G06F 11/3495 |
| 2017/0251007 A1* | 8/2017 | Fujisawa | H04L 63/1425 |
| 2017/0374174 A1* | 12/2017 | Evens | H04L 67/322 |
| 2018/0034845 A1* | 2/2018 | Diebenbusch | H04L 43/028 |
| 2018/0176253 A1* | 6/2018 | Koster | H04L 63/20 |
| 2018/0225606 A1* | 8/2018 | Curcic | G06Q 10/0635 |
| 2018/0262422 A1* | 9/2018 | Gerstel | H04L 45/22 |
| 2018/0309778 A1* | 10/2018 | Sugarbaker | H04L 63/1433 |

* cited by examiner

*Primary Examiner* — Jeffery L Williams
(74) *Attorney, Agent, or Firm* — Nicholas Pfeifer; Smith & Hopen, P. A.

(57) ABSTRACT

A method of assessing the security of a user's connection to a Sequenced Packet Exchange (SPX) network and the user's consumption of services via the SPX network. The invention includes digitally accessing a plurality of network nodes and obtaining data transmissions through said plurality of network nodes. Each transmission corresponds to a security implementation of a current state of the user's connection or consumption of SPX services. A coefficient is determined for each security implementation, wherein the coefficient corresponds to a weight given to each security implementation in determining a level of security of the user's connection or consumption. A security score representative of the level of security of the user's connection is calculated as a function of the security implementation and their corresponding coefficients. The security score is output to the user.

19 Claims, 6 Drawing Sheets

FIG. 7

METHOD OF ASSESSING REAL-TIME SECURITY OF SEQUENCED PACKET EXCHANGE (SPX) NETWORK CONNECTION

CROSS-REFERENCE TO RELATED APPLICATIONS

This nonprovisional application is a continuation of and claims priority to provisional application No. 62/560,154, entitled "METHOD OF ASSESSING REAL-TIME SECURITY OF SEQUENCED PACKET EXCHANGE (SPX) NETWORK CONNECTION," filed Sep. 18, 2017 by the same inventor.

BACKGROUND OF THE INVENTION

1. Field of the Invention

This invention relates to the field of network communications. More specifically, it relates to a method of assessing the security of connections and services on a Sequenced Packet Exchange (SPX) network in real time.

2. Brief Description of the Related Art

The security of a connection to an SPX network is an important consideration for SPX users. There is a strong need for a tool capable of automatically assessing real-time security of users' consumption of services on an SPX network. There is also a need for a tool configured to evaluate an SPX connection and provide personalized suggestions as to how the security of that connection can be improved. Accordingly, what is needed is a method of automatically analyzing an SPX connection, calculating and quantifying the security of an SPX connection and services based on a plurality of real-time inputs received from the SPX network components and, then, communicating that the level of security to the users in a clear and unambiguous manner and informing them as to how they can improve the security of their SPX experience.

BRIEF SUMMARY OF THE INVENTION

The long-standing but heretofore unfulfilled need for automatically analyzing an SPX connection, calculating and quantifying the security of an SPX connection and services based on a plurality of real-time inputs received from the SPX network components and, then, communicating that the level of security to the users in a clear and unambiguous manner and informing them as to how they can improve the security of their SPX experience is now met by a new, useful, and nonobvious invention.

The novel method of assessing the security of a user's connection to and use of a Sequenced Packet Exchange (SPX) network includes first providing an SPX network. The SPX network has a plurality of network nodes. In an embodiment, the plurality of network nodes includes an ingress node, an in-transit node, and an egress node. The nodes are each digitally accessed and the data transmissions through the nodes are analyzed. In an embodiment, application programming interfaces are employed to access the plurality of nodes.

The data transmissions are used to identify the user that initiated the transmission. An embodiment identifies the IP address related to the transmission and then compares the IP address to a database of IP addresses corresponding to a plurality of users. Having identified the IP address and users, the system identifies the security implementations employed by the user at the nodes. In an embodiment, the system identifies the security implementations employed by the user at each of the ingress node, the in-transit node, and the egress node. A coefficient for each of the plurality of security implementations is determined, the coefficient corresponding to a weight given to each of the security implementations for determining a level of security of the transmission. A security score representative of the level of security of the transmission is then calculated as a function of the security implementations and their corresponding coefficients. Finally, the security score is output to the user.

An embodiment may include a step of automatically transmitting a notification to the user in response to the security score falling below a predetermined threshold. An embodiment further includes the steps of determining security implementations having coefficients below a predetermined threshold, querying a database that identifies the coefficients for each security implementation, and outputting to the user alternative security implementations that have coefficients above the predetermined threshold to replace the security implementations having coefficients below the predetermined threshold. In an embodiment, an improvement value of the security score corresponding to each alternative security implementations is calculated and output to the user.

In an embodiment, the step of identifying a plurality of security implementations employed by the user includes identifying the node through which the transmission has traveled. If the node is an ingress node, the system determines if the security implementation corresponds to an access over public internet, a VPN connection over public internet, a standard cellular wireless connection, a secure cellular wireless connection, a direct leased line connection using user provided network equipment, or a direct leased line connection using security verified network equipment. If the node is an in-transit node, the system determines if the security implementation corresponds to a standard 'in clear' transmission, if encryption is enabled, if device analytics are enabled, or if policy enforcement is applied. If the node is an egress node, the system determines if the security implementation corresponds to a Connection to a Customer Application or network using a direct leased line connection using user provided network equipment or corresponds to a connection to a customer application or network using a direct leased line connection using security verified network equipment.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Figure 1:
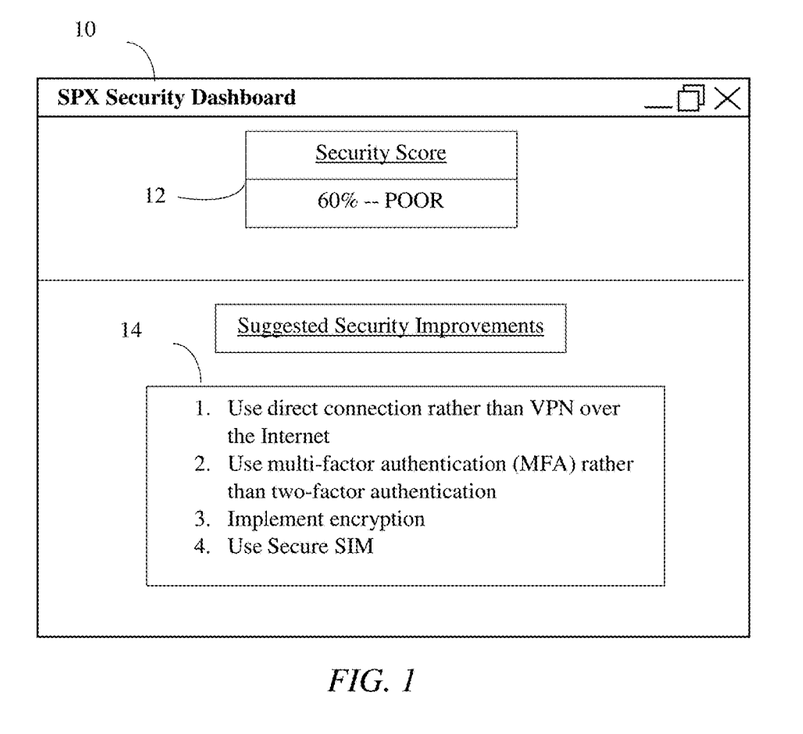
FIG. 1 is a schematic representation of an exemplary dashboard tool outputting a real-time security score and recommendation on the steps to improve it.

The invention includes a system and method for automatically accessing Sequenced Packet Exchange (SPX) connections and services to measure, in real-time, how securely consumers are consuming SPX services. The invention is adapted to automatically analyze various data transmissions through SPX nodes and identify customer service profiles. The invention can then automatically assess each customer's SPX security based on weighted average scoring, and history tracking using customer service profiles and the information gathered from the data transmissions through SPX nodes. In an embodiment, as depicted in FIG. 1, SPX customers are automatically presented with security dashboard window 10, such as a modal window, to explain the current state of their SPX security as shown in security score dialog box 12 and provide automated security improvement suggestions as exemplified in security improvement dialog box 14.

There are various types of connections to SPX networks including the following: direct connection, virtual private network (VPN), on premises software, cloud, hardware router, virtual router, internet of things (JOT) device, etc. A user can implement various information assurance functions, such as encryption and hashing. There are also various types of authentication, such as standard two-factor authentication, multi-factor authentication (MFA)/PINN, etc. The invention is able to automatically collect these various security implementations (as inputs) from various network components. The system assigns weights for each of these security implementations, and calculates a weighted average score (as an output). This score is referred to as the security score.

Figure 2:
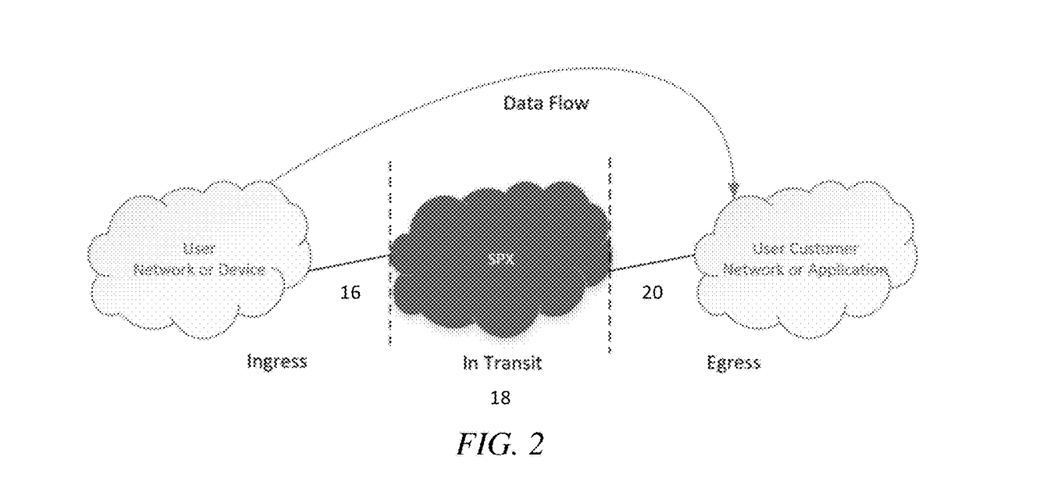
FIG. 2 is a diagram of an exemplary data transmission through an SPX network.

As depicted in FIG. 2, SPX connections can be separated into three main dimensions: ingress, in-transit, and egress. The ingress dimension refers to ingress traffic 16—data traffic originating outside of the SPX network that is transmitted to the SPX network. The ingress dimension can be categorized based on the type of ingress traffic 16. Ingress traffic 16 includes, but is not limited to, access over public internet, VPN connection over public internet, standard cellular wireless connection, secure cellular wireless connection, direct leased line connection using user provided network equipment, and direct leased line connection using provided network equipment.

The in-transit dimension refers to the data traffic 18 transmitted within the SPX network. The in-transit dimension can be categorized based on the type of in-transit traffic 18. In-transit traffic 18 includes, but is not limited to, standard 'in clear' transmission—no encryption, analytics or policies applied, encryption enabled, device analytics enabled, and policy enforcement applied.

Finally, the egress dimension refers to egress traffic 20—data traffic transmitted from the SPX network to a network/application/device outside of the SPX network. The egress dimension can be categorized based on the type of egress traffic 20. Egress traffic 20 includes, but is not limited to, connection to customer application or network through a direct leased line connection using user provided network equipment, connection to customer application or network through a direct leased line connection using security verified network equipment, such as Syniverse network equipment, connection to customer cloud through a direct leased line connection using user provided network equipment, and connection to customer cloud through a direct leased line connection using security verified network equipment.

An embodiment may also include a management dimension. The management dimension includes user-initiated actions/platforms, including but not limited to, insider threat security solutions, including user/employee monitoring, employee activity monitoring, behavioral analytics, policy enforcement, and digital forensics.

Figure 3:
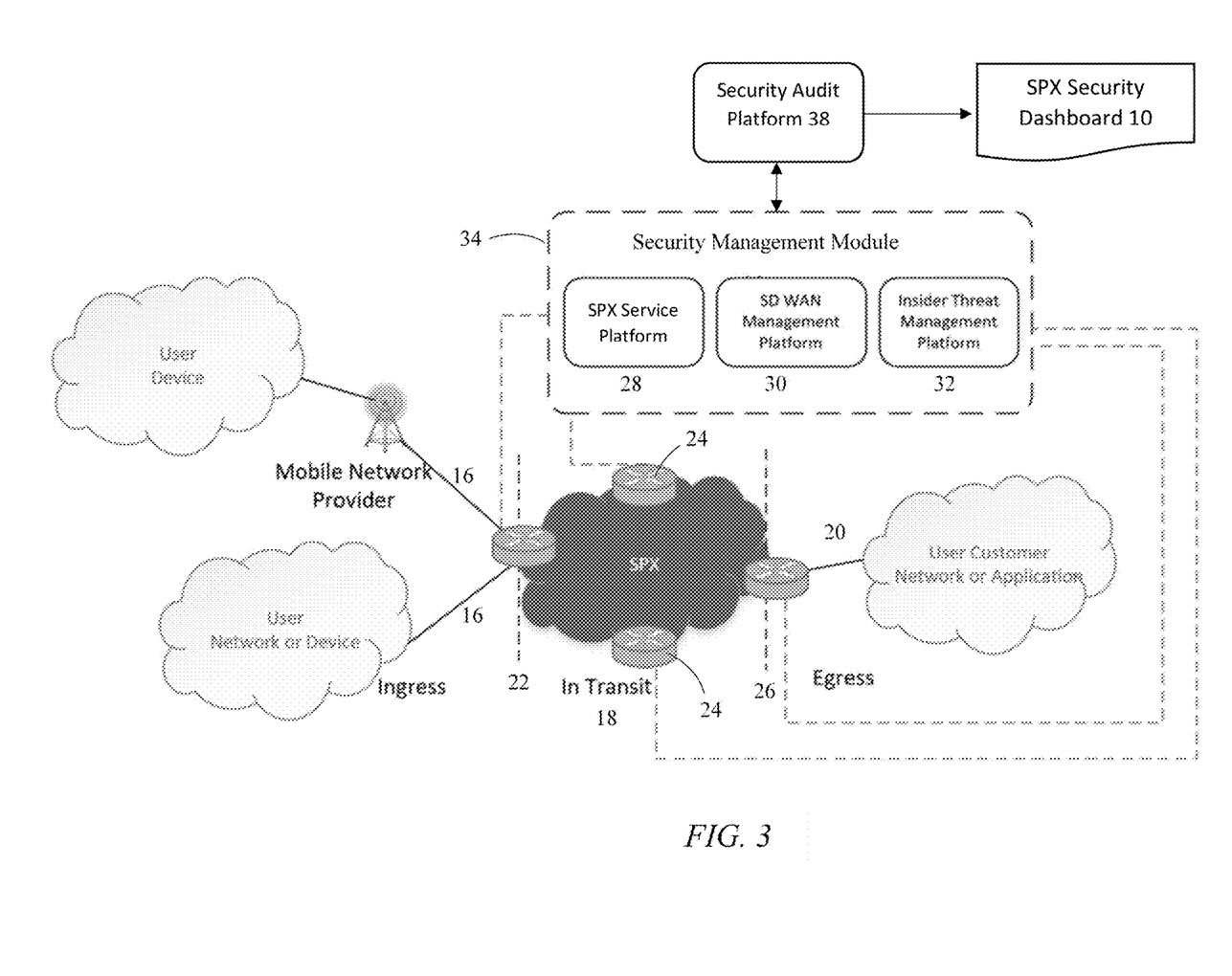
FIG. 3 is a diagram of the present invention incorporated in an exemplary data transmission through an SPX network.

The present invention includes a method for automatically determining the security implementation for each dimension, which in turn will determine the security score of the SPX connection and consumption of services on the SPX network. Referring now to FIG. 3, an embodiment of the present invention includes security management module 34 that digitally connects to various nodes in the SPX network and monitors said nodes for data transmissions. In an embodiment, security management module 34 monitors ingress node(s) 22, in-transit node(s) 24, and egress node(s) 26.

In the embodiment depicted in FIG. 3, security monitoring module 34 is in communication with SPX service platform 28, SD WAN management platform 30, and insider threat management platform 32. In an embodiment, security monitoring module 34 may store one or more of SPX service platform 28, SD WAN management platform 30, and insider threat management platform 32 in memory.

SPX service platform 28 is an application that contains records of various customer connectivity implementations, including details of the ingress, in-transit, and egress connectivity methods. SPX service platform 28 may include but is not limited to the following type of data: customer site location address, number of devices, total capacity requirements (Mb or Gb); IP addressing scheme, cellular wireless details (mobile number, IMSI range, etc.), etc. SPX service platform 28 stores connectivity information that security monitoring module 34 can access and identify.

SD WAN (software defined wide area network) management platform 30 is an application that contains software defined network connectivity details which is required to facilitate the on-ramp, configuration, management and support of a customer connection when its related to a leased line or a direct connection. SD WAN management platform 30 contains information necessary to build, configure, manage and support the connectivity, and also contains in-transit services, if enabled, such as encryption, device analytics and policy management.

Security monitoring module 34 is adapted to analyze the data transmissions passing through the various nodes and identify the customer by identifying the IP address of the data transmission and determining which customer uses that IP address. In an embodiment, security monitoring module 34 identifies whether the data transmission is an ingress, in-transit, or egress transmission based on the characteristics of the data transmission. For example, a cellular wireless data transmission is always an ingress transmission.

Once security monitoring module 34 has identified whether the data transmission is an ingress, in-transit, or egress transmission, security monitoring module 34 determines if the security implementation information is stored in SPX service platform 28, is stored in SD WAN management platform 30, or is dynamically identifiable through the data being transmitted. For example, location information, behavior information, and the size of the data/transmission are dynamically identified via the data being transmitted. For statically identifiable security implementations, the system identifies the customer associated with the data transmission and then accesses SPX service platform 28 or SD WAN management platform 30 to identify which security implementations the customer is using. The following tables include the identification methods for various security implementations in each of the ingress, in-transit, and egress dimensions.

TABLE 1

| Dimension | Implementation | Identification Method |
|---|---|---|
| INGRESS | Access over Public Internet | SPX Service Platform |
| | VPN Connection over Public Internet | SPX Service Platform |
| | Standard Cellular Wireless Connection | SPX Service Platform |
| | Secure Cellular Wireless Connection | SPX Service Platform |
| | Direct Leased Line Connection using User Provided Network Equipment | SD WAN Management Platform |
| | Direct Leased Line Connection using security verified Network Equipment | SD WAN Management Platform |

TABLE 2

| Dimension | Implementation | Identification Method |
|---|---|---|
| IN TRANSIT | Standard 'in clear' transmission no — encryption, analytics or policies applied | SD WAN Management Platform |
| | Encryption Enabled | SD WAN Management Platform |
| | Device Analytics Enabled | SPX Service Platform |
| | Policy Enforcement Applied | SPX Service Platform |

TABLE 3

| Dimension | Implementation | Identification Method |
|---|---|---|
| EGRESS | Connection to Customer Application or network using Direct Leased Line Connection using User Provided Network Equipment | SD WAN Management Platform |
| | Connection to Customer Application or network using Direct Leased Line Connection using security verified Network Equipment | SD WAN Management Platform |
| | Connection to Customer Cloud using Direct Leased Line Connection using User Provided Network Equipment | SD WAN Management Platform |
| | Connection to Customer Cloud using Direct Leased Line Connection using security verified Network Equipment | SD WAN Management Platform |

An embodiment includes insider threat management platform 32. Insider threat management platform 32 is a platform/application that provides insider threat security solutions for various customers, including employee monitoring, employee activity monitoring, behavioral analytics, policy enforcement, and digital forensics.

TABLE 4

| Dimension | Implementation | Identification Method |
|---|---|---|
| MANAGEMENT | Insider threat security solutions, including user/employee monitoring, user activity monitoring, behavioral analytics, policy enforcement, and digital forensics | Insider Threat Management Platform |

Security management module 34 is in communication with security audit platform 38. Security management module 34 may operate independently to constantly and automatically monitor various nodes in the SPX network. In an embodiment, security audit platform 38 instructs security management module 34 to monitor the various nodes and identify the security implementations of the various dimensions of the data transmissions. An embodiment includes security management module 34 automatically sending the identified security implementations to security audit platform 38, which then calculates the security score and automatically outputs the security score to SPX security dashboard 10.

The security score represents the SPX customer's level of security, including the security level of the SPX connection and the security level associated with the consuming services via the SPX network. The security level is established by weighting the specific implementations of the dimensions being monitored, including but not limited to ingress traffic, in-transit traffic, egress traffic, and insider threat management. The exemplary tables below provide an example of how various implementations are weighted:

TABLE 5

| Dimension | Implementation | Security Weight/Coefficient |
|---|---|---|
| INGRESS | Access over public internet | 0 |
| | VPN connection over public internet | 1 |
| | Standard cellular wireless connection | 2 |
| | Secure cellular wireless connection | 3 |
| | Direct leased line connection using user provided network equipment | 4 |
| | Direct leased line connection using security verified network equipment | 5 |

TABLE 6

| Dimension | Implementation | Security Weight/Coefficient |
|---|---|---|
| IN TRANSIT | Standard 'in clear' transmission — no encryption, analytics or policies applied | 0 |
| | Encryption enabled | 1 |
| | Device analytics enabled | 2 |
| | Policy enforcement applied | 3 |

TABLE 7

| Dimension | Implementation | Security Weight/Coefficient |
|---|---|---|
| EGRESS | Connection to customer application or network using direct leased line connection | 4 |

TABLE 7-continued

| Dimension | Implementation | Security Weight/Coefficient |
|---|---|---|
| | using user provided network equipment | |
| | Connection to customer application or network using direct leased line connection network equipment | 5 |
| | Connection to customer cloud using direct leased line connection using user provided network equipment | 4 |
| | Connection to customer cloud using direct leased line connection using security verified network equipment | 5 |

As evidenced in Tables 5-7 above, the more secure the security implementation, the greater the security weight/coefficients. The coefficients determine how much weight is given to a particular security implementation when calculating an overall security score. The security score is calculated according to a predetermined function and quantifies the level of security at which the SPX customer is connected to and is consuming services on the SPX network. In an embodiment, the coefficients corresponding to each security implementation are predefined. In an alternative embodiment, the coefficients may be calculated dynamically based on a service the user is consuming, the user's geographic location, current sources of security concerns, etc. In an embodiment, certain implementations may have values that far exceed the values of other implementations based on the level of importance of each implementation.

The following examples help explain how a security score can be determined.

Example 1

User connects to SPX network using a VPN over the Internet and does not enable any additional security features in SPX to access an application in the cloud, using a direct connection with customer provided equipment.

| Ingress | In Transit | Egress |
|---|---|---|
| VPN over the Internet | Clear (none) | Cloud application using customer provided equipment |

The weightage for this connection is:

| Ingress | In Transit | Egress | Total Score |
|---|---|---|---|
| 1 | 0 | 4 | 5 |

Example 2

User connects to SPX using a standard cellular wireless connection and does not enable any additional security features in SPX to access a customer network, using direct connection with security verified network equipment.

| Ingress | In Transit | Egress |
|---|---|---|
| Standard cellular wireless | Clear (none) | Connection to customer application or network using direct leased line connection using security verified network equipment |

The weightage for this connection is:

| Ingress | In Transit | Egress | Total Score |
|---|---|---|---|
| 2 | 0 | 5 | 7 |

Example 3

User connects to SPX using a direct leased line connection security verified network equipment and enables policy control and analytics in SPX to access a customer network using direct connection with security verified network equipment.

| Ingress | In Transit | Egress |
|---|---|---|
| Direct leased line connection using security verified network equipment | Device analytics are enabled, and policy enforcement is applied | Connection to customer application or network using direct leased line connection using security verified network equipment |

The weightage for this connection is:

| Ingress | In Transit | Egress | Total Score |
|---|---|---|---|
| 5 | 2 + 3 | 5 | 15 |

The total score for each example can be compared to a highest total score to convert the security score into a percent value of the maximum level of security.

Figure 4:
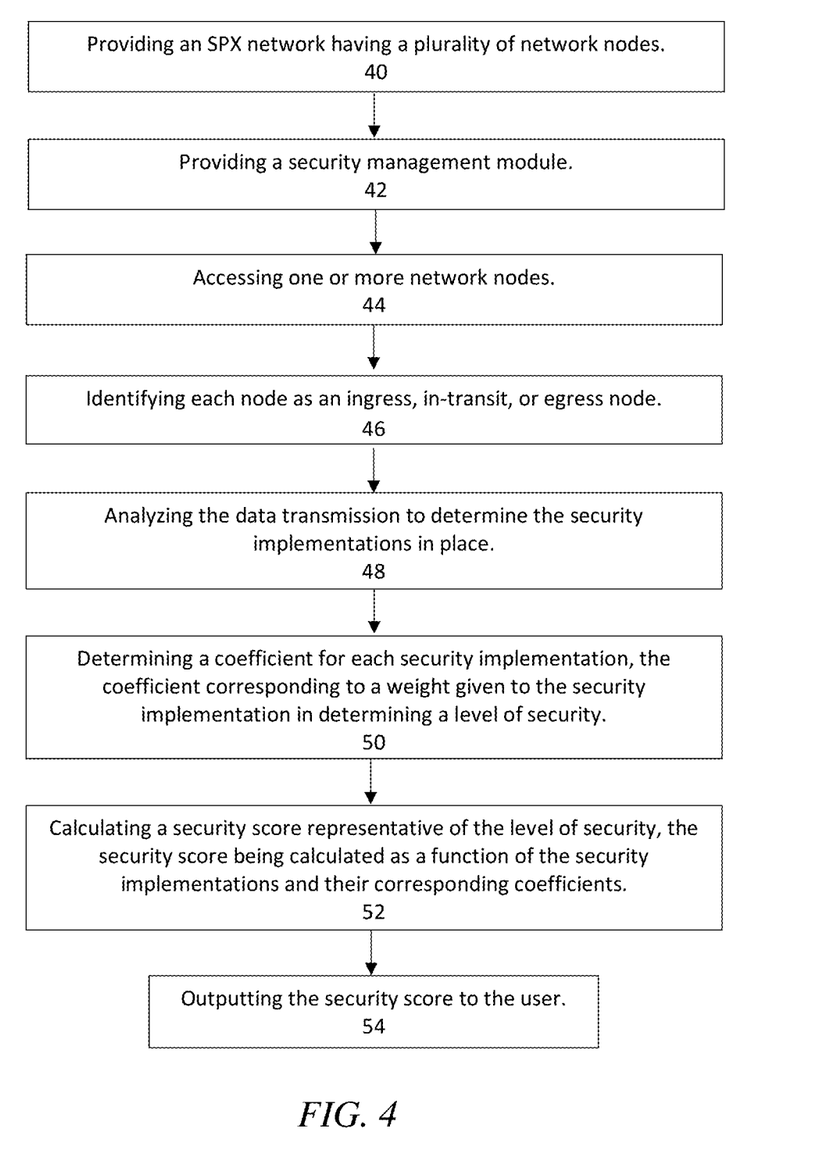
FIG. 4 is a flowchart schematically depicting the steps involved in the present invention.

As shown in FIG. 4, the invention automatically determines how a customer can improve the security score of the SPX connection and consumption of SPX services. The novel method includes first step 40—providing an SPX network having a plurality of network nodes. A security management module is also provided at step 42 and the security management module accesses one or more of a plurality of network nodes at step 44. Each node is then identified as being an ingress, in-transit, or egress node at step 46. The identification of each node as ingress, in-transit, or egress is accomplished based on the direction of the transmission and the location of the transmissions. For example, a transmission from the device end will always be ingress, a transmission from the application end will always be egress, and in-transit transmissions occur on the nodes/capabilities within SPX network.

Having identified the node, the data transmission is analyzed to determine the various security implementations in place at step 48. At step 50, a coefficient for each security implementation is determined; the coefficient corresponding to a weight given to the security implementation in determining a level of security. Then, at step 52, a security score, representative of the level of security, is calculated as a function of the security implementations and their corresponding coefficients. Finally, the security score is outputted to the user in step 54.

Figure 5:
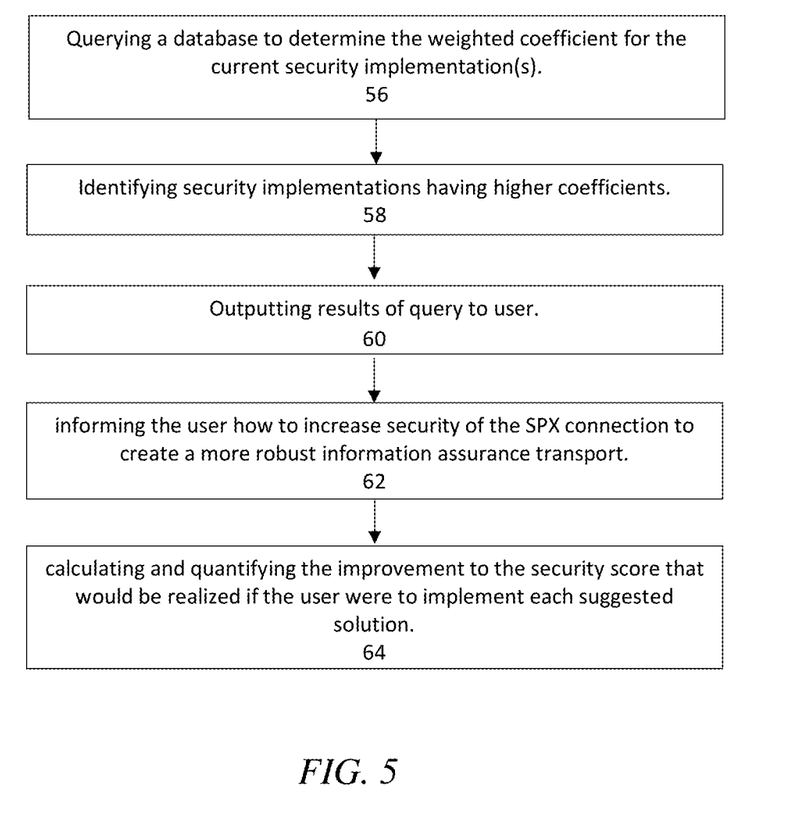
FIG. 5 is a flowchart schematically depicting the steps involved in an embodiment of the present invention.

As shown in FIG. 5, an embodiment of the invention determines whether improved security implementations could improve the security score. The invention queries a database to determine the weighted coefficient for the current security implementation at step 56 and then identifies security implementations having higher coefficients at step 58. The dashboard tool outputs the results of the query to the user at step 60 and informs the user of the steps that he can take to increase security of the SPX connection to create a more robust information assurance transport at step 62. In an embodiment, the invention calculates and quantifies the improvement to the security score that would be realized if the user were to implement each suggested solution at step 64. This feature of the invention enables the user to prioritize the suggested security improvements based on the impact they will have on the overall security score. Some of these categories can be expanded, to include DDOS prevention, monitoring and reporting, PennTesting etc.

Figure 6:
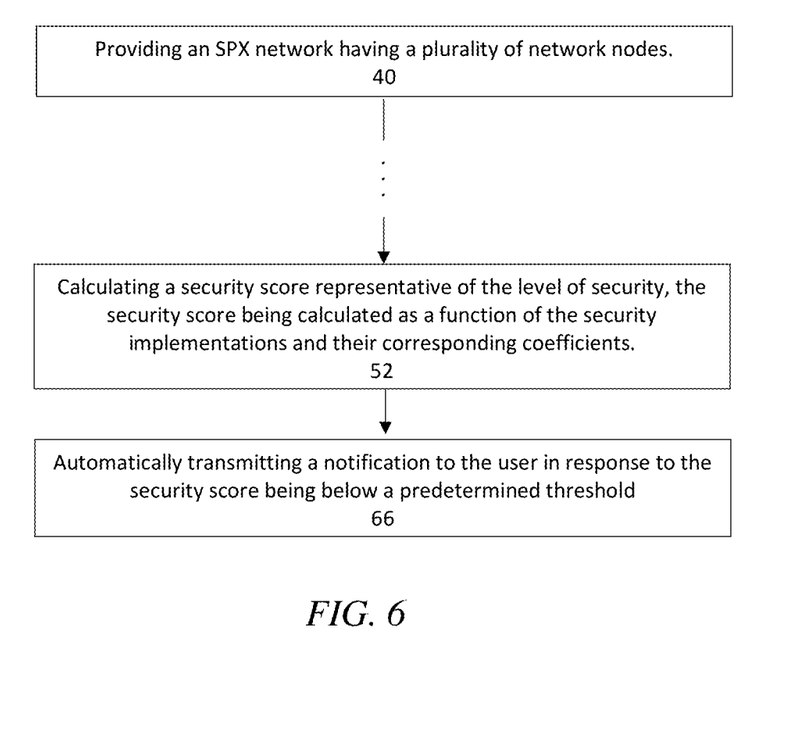
FIG. 6 is a flowchart schematically depicting the steps involved in an embodiment of the present invention.
Figure 7:
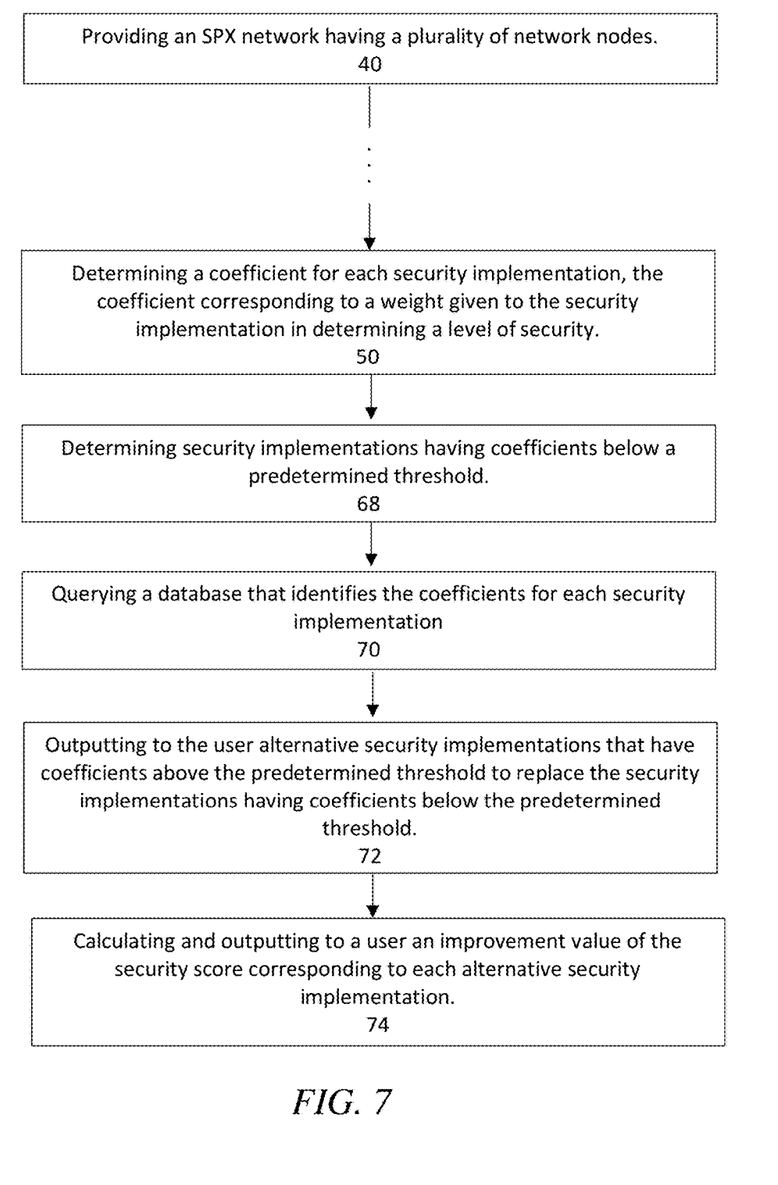
FIG. 7 is a flowchart schematically depicting the steps involved in an embodiment of the present invention.

As depicted in FIG. 6, an embodiment may include a step of automatically transmitting a notification to the user in response to the security score being below a predetermined threshold at step 66. As shown in FIG. 7, an embodiment includes the steps of determining security implementations having coefficients below a predetermined threshold at step 68, querying a database that identifies the coefficients for each security implementation at step 70, and outputting to the user alternative security implementations that have coefficients above the predetermined threshold to replace the security implementations having coefficients below the predetermined threshold at step 72. In an embodiment, an improvement value of the security score corresponding to each alternative security implementation is calculated and output to the user at step 74.

The system is able to diagnose whether additional security and information assurance features (functions of the secure network) can be enabled to further secure the SPX customer's connection. If the customer implements the additional suggested measures, the security score improves, thereby motivating the customers to better secure their connections and services.

In an embodiment, the present invention compares the security weight of the ingress, in-transit, and egress transmissions to minimum values for each to allow transmission through the SPX network. In an embodiment, the present invention compares the combined security weight for ingress, in-transit, and egress transmissions to ensure that the combination of security weights exceeds a minimum value to allow transmission through the SPX network.

An embodiment may rely on the security weights as a basis for requiring secondary or out-of-network additional authentication protocols. If the individual security weight of the ingress, in-transit, or egress transmissions fails to meet a minimum threshold, then the system may automatically require that an end user engage in secondary authentication protocols. Likewise, the system may rely on a combined security weight threshold for automatically triggering secondary authentication protocols.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of assessing security of a user's connection to a Sequenced Packet Exchange (SPX) network, the method comprising:
   providing an SPX network, the SPX network have a plurality of network nodes;
   digitally accessing one or more of the plurality of network nodes;
   analyzing a transmission passing through one or more of the plurality of network nodes;
   identifying a user that initiated the transmission via properties of the transmission;
   identifying a plurality of security implementations employed by the user;
   determining a coefficient for each of the plurality of security implementations, the coefficient corresponding to a weight given to each of the security implementations for determining a level of security of the transmission;
   calculating a security score representative of the level of security of the transmission, the security score being calculated as a function of the security implementations and their corresponding coefficients; and
   automatically outputting the security score to the user.

2. The method of claim 1, wherein the plurality of network nodes include an ingress node, an in-transit node, and an egress node.

3. The method of claim 1, further comprising the steps of determining security implementations having coefficients below a predetermined threshold, querying a database that identifies the coefficients for each security implementation, and outputting to the user alternative security implementations that have coefficients above the predetermined threshold to replace the security implementations having coefficients below the predetermined threshold.

4. The method of claim 3, further comprising the step of calculating an improvement value of the security score corresponding to each alternative security implementations, and outputting the calculated improvement values to the user.

5. The method of claim 1, wherein the step of identifying the user that initiated the transmission includes comparing an IP address of the transmission to a list of known IP addresses for a plurality of users, comparing an origin IMSI or MSISDN of the transmission to a list of known IMSI or MSISDN for a plurality of users, or comparing a unique identifier for an IoT Device to a list of known identifiers for a plurality of user IoT devices.

6. The method of claim 1, wherein the step of digitally accessing one or more of the plurality of network nodes further includes employing an application programming interface to gain access to the network nodes.

7. The method of claim 1, wherein the step of identifying a plurality of security implementations employed by the user includes:
   identifying the node through which the transmission has traveled;
   if the node is an ingress node, determining if the security implementation corresponds to an access over public internet, a VPN connection over public internet, a standard cellular wireless connection, a secure cellular wireless connection, a direct leased line connection using user provided network equipment, or a direct leased line connection using security verified network equipment;
   if the node is an in-transit node, determining if the security implementation corresponds to a standard 'in clear' transmission, if encryption is enabled, if device analytics are enabled, or if policy enforcement is applied; and
   if the node is an egress node, determining if the security implementation corresponds to a Connection to a Customer Application or network using a direct leased line connection using user provided network equipment or corresponds to a connection to a customer application or network using a direct leased line connection using security verified network equipment.

8. A method of assessing security of a user's connection to a Sequenced Packet Exchange (SPX) network, the method comprising:
   providing an SPX network, the SPX network have a plurality of network nodes, including an ingress node, an in-transit node, and an egress node;
   digitally accessing the ingress node, the in-transit node, and the egress node;
   analyzing a transmission passing through the ingress node, the in-transit node, and the egress node;
   identifying a user that initiated the transmission via properties of the transmission;
   identifying a plurality of security implementations employed by the user at each of the ingress node, the in-transit node, and the egress node;
   determining a coefficient for each of the plurality of security implementations, the coefficient corresponding to a weight given to each of the security implementations for determining a level of security of the transmission;
   calculating a security score representative of the level of security of the transmission, the security score being calculated as a function of the security implementations and their corresponding coefficients; and
   automatically outputting the security score to the user.

9. The method of claim 8, further comprising the steps of determining security implementations having coefficients below a predetermined threshold, querying a database that identifies the coefficients for each security implementation, and outputting to the user alternative security implementations that have coefficients above the predetermined threshold to replace the security implementations having coefficients below the predetermined threshold.

10. The method of claim 9, further comprising the step of calculating an improvement value of the security score corresponding to each alternative security implementations, and outputting the calculated improvement values to the user.

11. The method of claim 8, wherein the step of identifying the user that initiated the transmission includes comparing an IP address of the transmission to a list of known IP addresses for a plurality of users.

12. The method of claim 8, wherein the step of digitally accessing one or more of the plurality of network nodes further includes employing an application programming interface to gain access to the network nodes.

13. The method of claim 8, wherein the step of identifying a plurality of security implementations employed by the user includes:
   identifying the node through which the transmission has traveled;
   if the node is an ingress node, determining if the security implementation corresponds to an access over public internet, a VPN connection over public internet, a standard cellular wireless connection, a secure cellular wireless connection, a direct leased line connection using user provided network equipment, or a direct leased line connection using security verified network equipment;
   if the node is an in-transit node, determining if the security implementation corresponds to a standard 'in clear' transmission, if encryption is enabled, if device analytics are enabled, or if policy enforcement is applied; and
   if the node is an egress node, determining if the security implementation corresponds to a Connection to a Customer Application or network using a direct leased line connection using user provided network equipment or corresponds to a connection to a customer application or network using a direct leased line connection using security verified network equipment.

14. A method of assessing security of a user's connection to a Sequenced Packet Exchange (SPX) network, the method comprising:
   providing an SPX network, the SPX network have a plurality of network nodes, including an ingress node, an in-transit node, and an egress node;
   digitally accessing the ingress node, the in-transit node, and the egress node;
   analyzing a transmission passing through the ingress node, the in-transit node, and the egress node;
   identifying a user that initiated the transmission via properties of the transmission;
   identifying a plurality of security implementations employed by the user at each of the ingress node, the in-transit node, and the egress node;
   determining a coefficient for each of the plurality of security implementations, the coefficient corresponding to a weight given to each of the security implementations for determining a level of security of the transmission;
   calculating a security score representative of the level of security of the transmission, the security score being calculated as a function of the security implementations and their corresponding coefficients; and
   responsive to the security score below a predetermined security score threshold, automatically transmitting a notification to the user.

15. The method of claim 14, further comprising the steps of determining security implementations that each have coefficients below a predetermined coefficient threshold, querying a database that identifies the coefficients for each security implementation, and outputting to the user alternative security implementations that have coefficients above the predetermined coefficient threshold to replace the security implementations having coefficients below the predetermined coefficient threshold.

16. The method of claim 15, further comprising the step of calculating an improvement value of the security score corresponding to each alternative security implementations, and outputting the calculated improvement values to the user.

17. The method of claim 14, wherein the step of identifying the user that initiated the transmission includes comparing an IP address of the transmission to a list of known IP addresses for a plurality of users.

18. The method of claim 14, wherein the step of digitally accessing one or more of the plurality of network nodes further includes employing an application programming interface to gain access to the network nodes.

19. The method of claim 14, wherein the step of identifying a plurality of security implementations employed by the user includes:
   identifying the node through which the transmission has traveled;
   if the node is an ingress node, determining if the security implementation corresponds to an access over public internet, a VPN connection over public internet, a standard cellular wireless connection, a secure cellular wireless connection, a direct leased line connection using user provided network equipment, or a direct leased line connection using security verified network equipment;
   if the node is an in-transit node, determining if the security implementation corresponds to a standard 'in clear' transmission, if encryption is enabled, if device analytics are enabled, or if policy enforcement is applied; and
   if the node is an egress node, determining if the security implementation corresponds to a Connection to a Customer Application or network using a direct leased line connection using user provided network equipment or corresponds to a connection to a customer application or network using a direct leased line connection using security verified network equipment.

* * * * *